United States Patent
Hampel

(10) Patent No.: US 7,136,949 B2
(45) Date of Patent: *Nov. 14, 2006

(54) METHOD AND APPARATUS FOR POSITION DEPENDENT DATA SCHEDULING

(75) Inventor: Craig Hampel, San Jose, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/076,867

(22) Filed: Mar. 11, 2005

(65) Prior Publication Data

US 2005/0160208 A1    Jul. 21, 2005

Related U.S. Application Data

(63) Continuation of application No. 09/906,900, filed on Jul. 16, 2001, now Pat. No. 6,877,054.

(51) Int. Cl.
*G06F 13/362* (2006.01)
*G06F 1/14* (2006.01)
*H03K 17/16* (2006.01)

(52) U.S. Cl. .................. 710/117; 711/160; 713/502

(58) Field of Classification Search ............ 710/107, 710/316; 711/141
See application file for complete search history.

(56) References Cited

U.S. PATENT DOCUMENTS

| | | | |
|---|---|---|---|
| 5,432,823 A | 7/1995 | Gasbarro et al. | |
| 5,742,798 A | 4/1998 | Goldrian | |
| 5,859,985 A | 1/1999 | Gormley et al. | |
| 6,070,217 A | 5/2000 | Connolly et al. | |
| 6,070,231 A * | 5/2000 | Ottinger | 711/141 |
| 6,154,821 A | 11/2000 | Barth et al. | |
| 6,226,757 B1 | 5/2001 | Ware et al. | |
| 6,313,674 B1 | 11/2001 | Akita et al. | |
| 6,321,343 B1 | 11/2001 | Toda | |
| 6,401,167 B1 | 6/2002 | Barth et al. | |
| 6,418,552 B1 | 7/2002 | Osborn | |
| 6,442,644 B1 | 8/2002 | Gustavson et al. | |
| 6,516,396 B1 | 2/2003 | Volk et al. | |
| 6,526,473 B1 | 2/2003 | Kim | |

FOREIGN PATENT DOCUMENTS

| | | |
|---|---|---|
| EP | 1 087 572 A2 | 3/2001 |
| JP | 0200035831 A | 7/1998 |

OTHER PUBLICATIONS

SLDRAM Inc., "SLDRAM18DR400 4 Meg x 18 SLDRAM", Jul. 9, 1998, pp. 1-69.

(Continued)

*Primary Examiner*—Christopher E. Lee
(74) *Attorney, Agent, or Firm*—Hunton & Williams LLP

(57) ABSTRACT

A method and apparatus for position dependent data scheduling for communication of data for different domains along a bus is provided. Having an awareness of the relative position of different domains along a bus, one embodiment of the present disclosure schedules bus operations to allow data from multiple bus operations to be simultaneously present on the bus while preventing interference among the data. The present disclosure is compatible with buses having a termination on one end and those having terminations on both ends. In accordance with one embodiment of the present disclosure, bus operations are scheduled so that first data of a first bus operation involving a first domain are not present at domains involved in a second bus operation at times that would result in interference with second data of the second bus operation.

27 Claims, 12 Drawing Sheets

OTHER PUBLICATIONS

Peter Gillingham, Mosaid Technologies, "SLDRAM: High-Performance, Open-Standard Memory," IEEE, Nov./Dec. 1997; pp. 29-39.
Peter Gillingham, Mosaid Technologies, "SLDRAM Architectural and Functional Overview," Aug. 29, 1997, pp. 1-14.
Microprocessor and Microcomputer Standards Subcommittee of the IEEE Computer Society, "Draft Standard For A High-Speed Memory Interface (SyncLink)," 1996, pp. 156.

* cited by examiner

METHOD AND APPARATUS FOR POSITION DEPENDENT DATA SCHEDULING

CROSS-REFERENCE TO RELATED APPLICATIONS

This patent application is a continuation of U.S. patent application Ser. No. 09/906,900, filed Jul. 16, 2001, now U.S. Pat. No. 6,877,054, which is hereby incorporated by reference herein in its entirety.

FIELD OF THE DISCLOSURE

The present disclosure relates generally to data communication systems and methods of scheduling bus communications in accordance with flight times, and, as a specific example, the present disclosure may be applied to memory systems having such properties.

BACKGROUND OF THE DISCLOSURE

Computers and other data processing equipment require memory devices to store data to be processed and a processor to process the data. To process the data, the data are moved from the memory devices to the processor, where the data are processed. Then, the results of the processing are moved to the memory devices. Thus, memory read operations are performed to move data from the memory devices to the processor and memory write operations are performed to move results of the processing from the processor to the memory devices. Memory read operations and memory write operations may be performed for other purposes, as well. For example, memory write operations may be used to store data in the memory devices prior to processing. Likewise, for example, memory read operations may be used to read the results of the previous processing operations from the memory devices after those processing operations have occurred. Memory read operations are also used to fetch instructions.

As faster computers and other data processing equipment are developed, concurrency continues to increase, for example, through multiprocessing and multithreading. The concurrency can lead to multiple outstanding memory read and write operations. As concurrency increases, the amount of information that can be communicated with memory devices per unit time, which may be referred to as memory bandwidth, needs to increase.

Each of the memory devices can hold only a certain amount of data. Since it is often necessary to process very large amounts of data, several memory devices are often grouped together to store the data. The memory devices are coupled to the processor by a bus. The processor and the memory devices are coupled to the bus at specific locations along the bus. Thus, one memory device may be closer to or farther from the processor than another memory device.

In the past, data were communicated over the bus relatively slowly, and the data were thought of as being present on the bus as a whole for a given period of time. Actually, as with any signal, the data can only propagate along the bus at a finite speed, limited by such factors as the speed of light and the dielectric constant associated with the bus. Thus, when data are communicated at sufficiently high rates, the data will not necessarily be present on the bus as whole at a given time, but will propagate as pulses along the bus in a manner reminiscent of waves propagating along the surface of a body of water.

Such pulses propagate in both directions along the bus. Moreover, if an end of the bus is not terminated with an impedance to match the characteristic impedance of the bus, pulses reaching that end of the bus will be reflected back along the bus in the opposite direction. For this reason, it is preferable to provide a termination for at least one end of the bus. While pulses may reflect from the unterminated end of the bus, the reflected pulses will eventually disappear from the bus when they reach the bus termination.

In the past, to avoid interference from multiple pulses and their reflections, memory bus operations were scheduled to occur only after the pulses and their reflections have had time to propagate along the bus to the bus termination. While the actual time for pulses and reflections to clear from the bus may vary depending on the location of a memory device along the bus, historically, a standardized delay in scheduling has been used, treating all memory devices as requiring the same amount of time for the bus to clear. Consequently, such scheduling has yielded relatively low channel efficiency. Low channel efficiency refers to the relatively low fraction of time that the bus is actually carrying data and the relatively high fraction of time during which further data cannot be carried over the bus while the pulses and their reflections are still present on the bus.

Thus, a technique is needed to increase the channel efficiency to provide more efficient utilization of the bus and a higher rate of data processing.

DETAILED DESCRIPTION OF EXEMPLARY EMBODIMENTS

Figure 1:
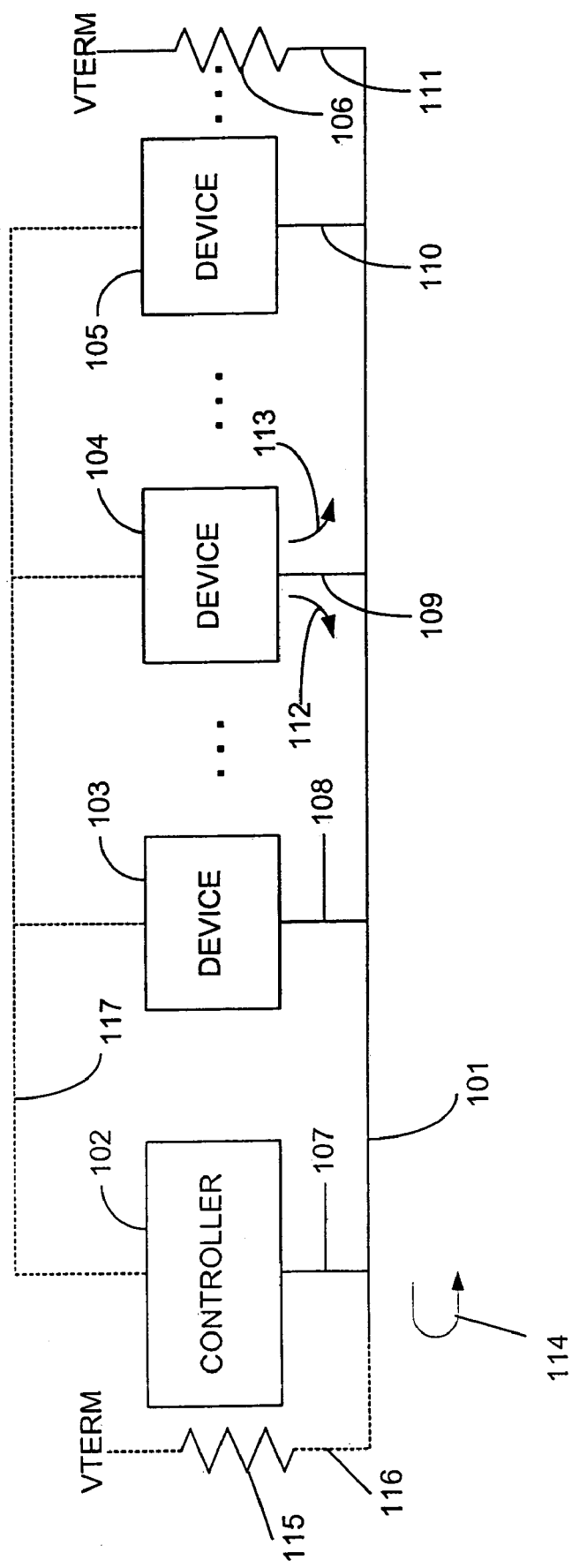
FIG. 1 is a block diagram illustrating a system to which the present disclosure may be applied.

A method and apparatus for position dependent data scheduling for communication of data for different domains along a bus is provided. Flight time is the time it takes for data to be communicated between different components in a bus system, for example, between a memory controller coupled to the bus and a memory device coupled to the bus. One or more components in a bus system may be organized into one or more domains. A domain is a set of one or more components that have substantially similar flight times from a similar reference point, for example, one or more devices that have the same flight time from a memory controller when measured in integral units of clock cycles. Thus, as an example, one or more devices having a flight time of three clock cycles from the controller would be in one domain, while another one or more devices having a flight time of five clock cycles from the controller would be in another domain. Generally, data can be considered to be moving between different domains located along a bus. For example, if a memory controller is in a domain designated as domain zero, and a memory device has a flight time of three clock cycles relative to the memory controller's domain, the memory device can be referred to as being in domain three.

Having an awareness of the relative position of different domains along a bus, one embodiment of the present disclosure schedules bus operations to allow data from multiple bus operations to be simultaneously present on the bus while preventing interference among the data. The present disclosure is compatible with buses having a termination on one end and those having terminations on both ends. In accordance with one embodiment of the present disclosure, bus operations are scheduled so that first data of a first bus operation involving a first domain are not present at domains involved in a second bus operation at times that would result in interference with second data of the second bus operation. Examples of such data include information to be processed, results of processing, instructions, graphical images, audio information, multimedia information, and textual information.

The present disclosure is preferably applied in systems in which data are communicated in pulses that are short relative to the propagation time for the medium over which the data are being transmitted. In a particularly preferred embodiment, the present disclosure is applied to a memory system having memory devices in different domains along a bus.

One common situation to which the present disclosure may be applied is when a read operation is to follow a write operation. The read operation generally cannot begin until some period of time after the beginning of the write operation. Traditionally, the read operation could not begin until the write data of the write operation had been cleared from the bus. This delay is referred to as the write/read bubble. However, one embodiment of the present disclosure allows a read operation to begin while the write data is still present on the bus.

Another situation to which the present disclosure may be applied is when a first read operation is followed by a second read operation to a different device than the first read operation. While, in the past, the second read operation could not begin until the read data of the first read operation had been cleared from the bus, one embodiment of the present disclosure allows the second read operation to begin while the read data of the first read operation is still present on the bus.

One embodiment of the present disclosure increases channel efficiency by scheduling bus communication as a function of the relative position of the devices with respect to each other.

One embodiment of the present disclosure reduces the effective write/read bubble in a system where the bit time is small relative to the flight time. It reduces the bandwidth loss while eliminating pattern interference from back-to-back reads to different devices, increasing voltage margin with minimal impact on performance. It reduces the bubble size for read-to-read situations while preventing back-to-back reads in the system to only the case where a 3/2 waves phenomenon might occur. A 3/2 waves phenomenon occurs when an attempt is made to drive a bus with a ½ amplitude wave when waves totaling an amplitude of 1 are present on the bus at the domain attempting to drive the bus. A 3/2 wave condition is undesirable because it requires additional transmitter and receiver complexity. Fully terminated busses have a similar problem to the 3/2 wave condition, and the present disclosure may be beneficially applied to fully terminated busses.

In accordance with another embodiment of the present disclosure, a read operation is begun prior to completion of a write operation, such that the write data is only guaranteed valid at the device being written. For example, a memory controller can allow read data to superimpose or pass write data if the write data has not yet reached the device being written provided the read data is not superimposed over the write data at the write device or if it has passed the device being written.

Two cases to which embodiments of the present disclosure are applicable may be expressed as a function of the devices' relative positions. These cases arise when a write to a device in a domain W is followed by a read to a device in a domain R. These domains are discussed without including the column access strobe (CAS) delays of the devices, but only the round trip flight time (TTr). The CAS delays involve time needed by the memory device to prepare data for transmission over the bus, while the round trip flight time is a delay intrinsic to the bus. It is understood that the CAS delay may be considered for scheduling in accordance with an embodiment of the present disclosure. The round trip flight time may include flight times of data and control signals. The data may be carried on the same or different conductors from the control signals. Control signals can include any necessary address information.

Of the two cases, a first case occurs when the device to be read in domain R is closer to the controller than the device to be written in domain W is to the controller. Thus, the flight time between domain R and the controller is shorter than the flight time between the controller and domain W. When a write followed by a read occurs under such circumstances, it is possible to start the read before the write has terminated. As long as the write data has passed the device being read, the read can begin. The incident wave associated with the read data travels behind the write data. No superposition of the read data and the write data occurs for this case. The first case also applies if the write and the read occur at the same device or nearby devices (i.e., if domain W is the same as domain R).

A second case occurs when domain R is farther away from the controller than domain W is from the controller. In that case, the write data is received at the device being written before it reaches the device being read. Since the write data has already been received, the read device can be scheduled to transmit read data such that the read data arrive at domain W immediately after the write has been completed at domain W. In this case, the read data will be superimposed on the write data after the write data have passed and been received at domain W. Thus, in the worst case, the read device has to drive the bus under a 3/2 wave condition, but interference to the write data by the read data at the device being written is avoided.

In accordance with an embodiment of the present disclosure, performance may be optimized during multiple sequential read operations by scheduling read operations based on the relative positions of the devices being read so as to minimize interference between waveforms. Assuming that a clock source or reference for read operations is traveling from a memory device to the controller, on a single-end terminated bus, it is possible to read a far device followed by a near device without creating a 3/2 wave condition. Similarly, on a doubly terminated bus, no interference of waveforms occurs under such circumstances. If a near device is read, followed by a far device, the incident wave from the near device can interfere with the driver of the far device. By selectively scheduling back-to-back read operations based on the relative positions of the devices from the controller, the interference can be avoided while improving channel efficiency as compared to controllers that do not provide scheduling based on position. Thus, the present disclosure provides increased efficiency on a bus where the total flight time is long relative to the bit time.

The present disclosure may be applied to memory systems, including memory systems having memory control, channels and dynamic random access memory (DRAM) devices. For example, the present disclosure may be applied to Rambus DRAM devices and systems. Examples of such Rambus DRAM devices include devices exhibiting clocking accuracy sufficient to allow multiple bits of data to be present on an electrical conductor simultaneously and devices utilizing current-mode drivers rather than push-pull drivers. In preferred embodiments, the present disclosure is applied in memory systems where the bit time is relatively short compared to the signal time required for a signal to propagate along the length of the bus. In another example, the present disclosure is applied to double data rate memory devices and systems. In certain double data rate devices, such as those devices which are sometimes referred to as "DDR" devices, (including devices referred to as "DDR2" devices, and systems, the devices are provided with tri-state output drivers, where the three possible states are a low-impedance logic zero output state, a low-impedance logic one output state, and a high-impedance state. With DDR and DDR2 devices, a subsequent memory operation cannot occur until a memory device involved in a previous memory operation has switched from one of the low-impedance states to the high-impedance state.

The present disclosure may be applied to double data rate memory devices and systems, including but not limited to DDR and DDR2 devices and systems, by identifying the flight times along the memory bus and scheduling memory operations such that data from one memory bus operation will not pass a memory device involved in another memory bus operation while the memory device is in a low-impedance state. By scheduling data to pass memory devices while the memory devices are in their high-impedance states, performance of DDR/DDR2 memory devices and systems can be improved while avoiding interference between different memory operations.

FIG. 1 is a block diagram illustrating a system to which the present disclosure may be applied. The system includes controller 102, device 103, device 104, device 105, termination 106, and, optionally, termination 115, all of which may be coupled to bus 101. While bus 101 is illustrated as a single path, it is understood that the present disclosure may be applied to a bus 101 having several paths, for example, a data bus having a separate conductor for each data bit being communicated. While data are referred to in plural, such reference denotes either plural data or a singular datum interchangeably.

Controller 102, device 103, device 104, and device 105 represent different domains along bus 101. Controller 102 is coupled to bus 101 via coupling 107. Device 103 is coupled to bus 101 via coupling 108. Device 104 is coupled to bus 101 via coupling 109. Device 105 is coupled to bus 101 via coupling 110. Termination 106 is coupled to bus 101 via coupling 111, preferably at a terminus of the bus. Optional termination 115 is coupled to bus 101 via coupling 116, preferably at an opposite terminus of the bus.

Each of termination 106 and optional termination 115 is coupled to termination voltage $V_{TERM}$. Termination 106 and optional termination 115 may comprise any impedance element, for example, a resistor or active impedance element, or may comprise an AC-coupled termination, for example, a capacitively-coupled termination. Examples of terminations include a single-referenced termination, where the termination is coupled to a single reference, such as a power or ground conductor, and a double-referenced termination, where the termination is coupled to multiple references. Bus 101 is terminated at a single end if termination 106 is coupled to bus 101, but optional termination 115 is omitted. Bus 101 is terminated at both ends, or doubly terminated, if optional termination 115 is coupled to bus 101 in addition to termination 106. Optional termination 115 may be combined with controller 102, or it may be separate.

While controller 102 is illustrated as being located at one end of the bus 101, controller 102 may alternatively be located elsewhere along bus 101. Moreover, while controller 102 is described as being the source of write data, the recipient of read data, and the entity performing the scheduling of the bus communication, such functions may be distributed among different entities, and their locations may also be different.

As depicted in FIG. 1, devices 103, 104, and 105 are located at different absolute distances from controller 102, as measured along the bus. Thus, the propagation delays between controller 102 and devices 103, 104, and 105 will be different. Also, the flight times of devices 103, 104, and 105 will be different. Relative distances between devices 103, 104, and 105 can be determined based on the absolute distances.

Controller 102, device 103, device 104, and device 105 may also be coupled by control bus 117. Control bus 117 may be used to pass control signals from controller 102 to devices 103 through 105. Examples of such control signals include signals representing addressing information and signals to control the writing of data to and the reading of data from a device, such as one or more of devices 103–105.

Control bus 117 may also be terminated at one or both ends. Devices 103–105 are provided as an example to illustrate a plurality of devices coupled to bus 101 and, optionally, to control bus 117. The present disclosure may be practiced with fewer or more devices.

Figure 2:
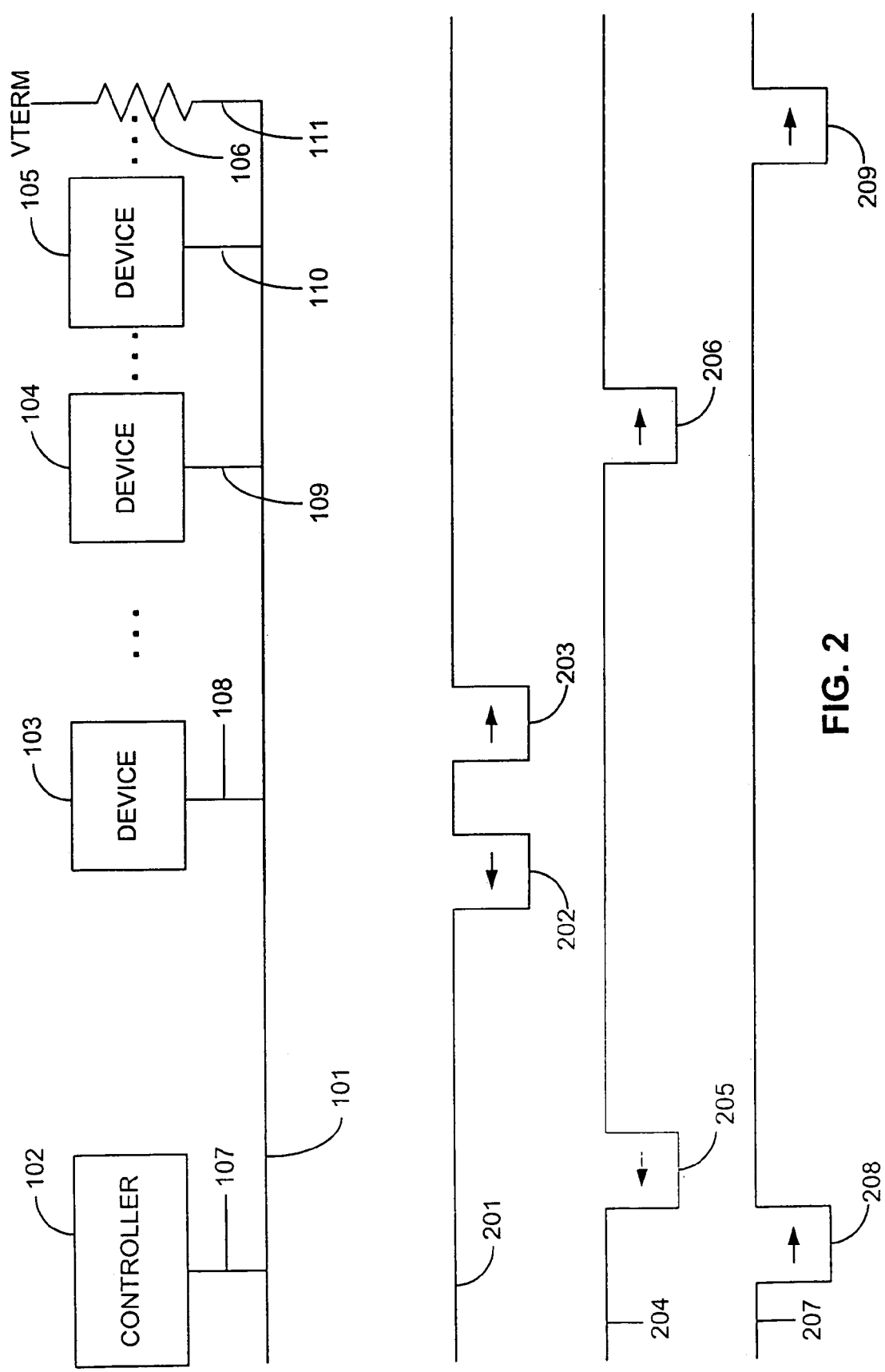
FIG. 2 is a timing diagram illustrating examples of locations of read data on bus 101 over time following a read operation at device 103.

FIG. 2 is a timing diagram illustrating examples of locations of read data on bus 101 over time following a read operation at device 103. Bus 101, controller 102, devices 103 through 105, termination 106 and couplings 107 through 111 are illustrated to provide a reference for the locations of the waves representing the read data on bus 101. Waveform 201 illustrates incident read wave 202 propagating away from device 103 toward controller 102 and incident terminating wave 203 propagating away from device 103 toward termination 106 shortly after the read operation has begun. Incident read wave 202 and incident terminating wave 203 result when device 103 transmits data to bus 101. If device 103 transmits data having an amplitude of 1, each of incident read wave 202 and incident terminating wave 203 will have half of that amplitude and will propagate in opposite directions away from device 103.

Waveform 204 illustrates incident read wave 205 and incident terminating wave 206. Incident read wave 205 and incident terminating wave 206 represent new locations of incident read wave 202 and incident terminating wave 203 at a time shortly after the time represented by waveform 201. As can be seen, during the time between waveform 201 and waveform 204, incident read wave 202 and incident terminating wave 203 have continued to propagate toward controller 102 and termination 106, respectively. When incident read wave 205 arrives at controller 102, the data conveyed by incident read wave 205 are received at controller 102. If the end of bus 101 near controller 102 is not terminated, incident read wave 205 is reflected by the end of the bus to become reflected wave 208 of waveform 207, which propagates toward termination 106. In a single-end-terminated system, it is also possible for incident read wave 205 and reflected wave 208 to be superimposed at the controller 102. In waveform 207, incident terminating wave 209 represents incident terminating wave 206 after continued propagation. When incident terminating wave 209 arrives at termination 106, no reflection occurs, and incident terminating wave 209 disappears from bus 101. Eventually, when reflected wave 208 arrives at termination 106, reflected wave 208 will also disappear from bus 101.

Figure 3:
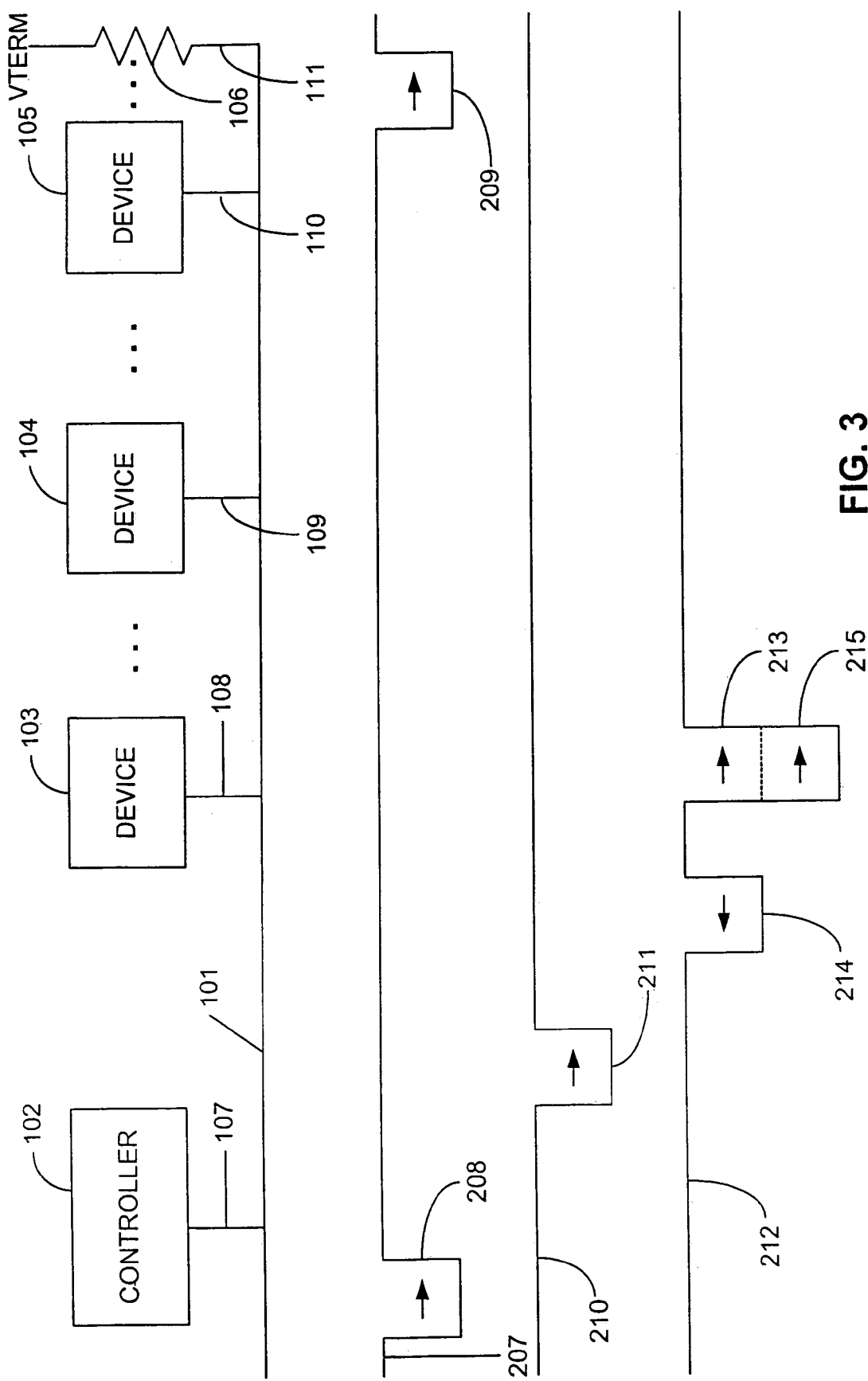
FIG. 3 is a timing diagram illustrating continued propagation of the waves of FIG. 2 and the occurrence of an additional read operation.

FIG. 3 is a timing diagram illustrating continued propagation of the waves of FIG. 2 and the occurrence of an additional read operation. FIG. 3 also illustrates bus 101, controller 102, devices 103 through 105, termination 106, and couplings 107 through 111 to provide a reference for the location of the waves. Waveform 207 provides continuity with FIG. 2, illustrating reflected wave 208 and incident terminating wave 209. Waveform 210 illustrates reflected wave 211, which represents reflected wave 208 after continued propagation. As can be seen, incident terminating wave 209 has arrived at termination 106 and is no longer present on bus 101 at the time of waveform 210. Waveform 212 occurs shortly after waveform 210. At the time of waveform 212, reflected wave 211 is passing device 103 and is illustrated as reflected wave 213. If a read operation occurs at device 103 at the time of waveform 212, data driven onto bus 101 by device 103 result in incident read wave 214 and incident termination wave 215. As can be seen, the presence of reflected wave 213 and incident terminating wave 215 at the same location simultaneously results in the superposition of reflected wave 213 and incident terminating wave 215. These two waves may not be completely in phase with each other as illustrated. They are illustrated as such for simplicity. Provided the devices coupled to bus 101 have driver circuitry capable of additively driving bus 101 with data, for example current mode driver circuitry, such superposition can be allowed to occur.

Figure 4:
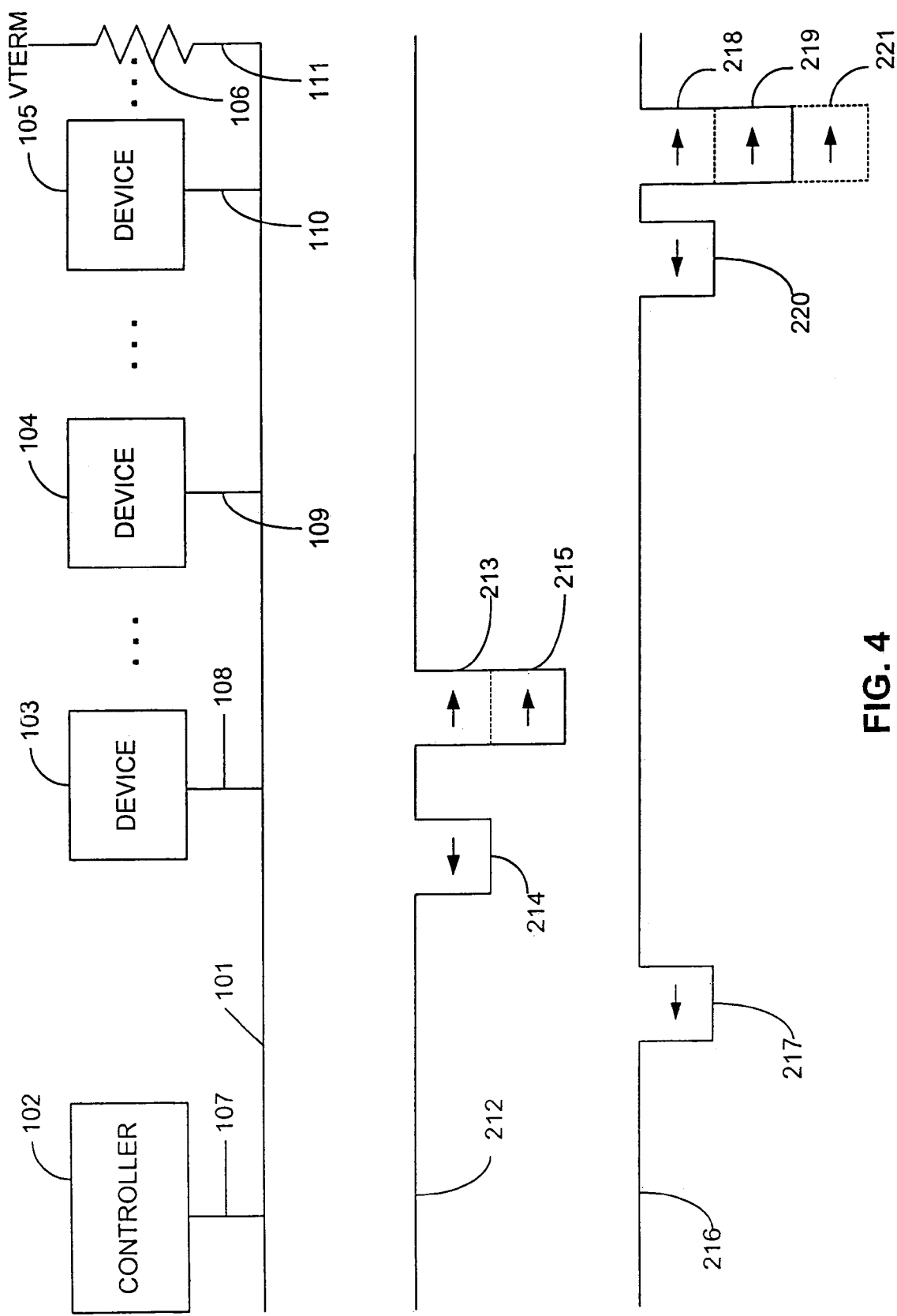
FIG. 4 is a diagram illustrating continued propagation of the waves of FIG. 3 and an additional read operation giving rise to a 3/2 wave condition.

FIG. 4 is a diagram illustrating continued propagation of the waves of FIG. 3 and an additional read operation giving rise to a 3/2 wave condition. Bus 101, controller 102, devices 103 through 105, termination 106, and couplings 107 through 111 are illustrated to provide a reference for the location of the waves. Waveform 212 provides continuity with FIG. 3 by illustrating reflected wave 213, incident read wave 214, and incident terminating wave 215. Waveform 216 illustrates incident read wave 217, reflected wave 218, and incident terminating wave 219. Incident read wave 217 represents continued propagation of incident read wave 214. Reflected wave 218 illustrates continued propagation of reflected wave 213. Incident terminating wave 219 illustrates continued propagation of incident terminating wave 215. Since reflected wave 213 and incident terminating wave 215 were present at the same location and traveling in the same direction in waveform 212, reflected wave 218 and incident terminating wave 219 also occur at the same location and are traveling in the same direction.

Waveform 216 illustrates reflected wave 218 and incident terminating wave 219 passing device 105 while a read operation occurs at device 105. As the driver or transmitter of device 105 attempts to drive bus 101 with data associated with the read operation, incident read wave 220 and incident terminating wave 221 are applied to bus 101. As can be seen, if incident terminating wave 221 is applied to bus 101 while reflected wave 218 and incident terminating wave 219 are passing device 105, the superposition of reflected wave 218, incident terminating wave 219, and incident terminating wave 211 results. When device 105 drives data onto bus 101, one half of a driving wave present at coupling 110 results in incident read wave 220, while the other half of the driving wave at coupling 110 is propagated as incident terminating wave 221. Thus, since each of incident read wave 220 and incident terminating wave 221 is counted as one half of the driving wave present at coupling 110, the superposition of three such half waves is referred to as a 3/2 wave condition. Designing a bus and its drivers to accommodate 3/2 wave conditions required additional complexity and is often undesirable. For example, the linear region of desirable driver circuitry may result in a voltage-current (V-I) curve that does not readily accommodate a 3/2 wave condition. As another example, driver impedance may be required to be excessively low to accommodate a 3/2 wave condition. Thus, it is desirable to provide a technique to avoid such 3/2 wave conditions. While 3/2 wave conditions can be undesirable for singly-terminated bus systems, 2/2 wave conditions can cause similar problems in doubly-terminated bus systems. Thus, it is also desirable to provide a technique to avoid such 2/2 wave conditions in doubly-terminated bus systems.

Figure 5:
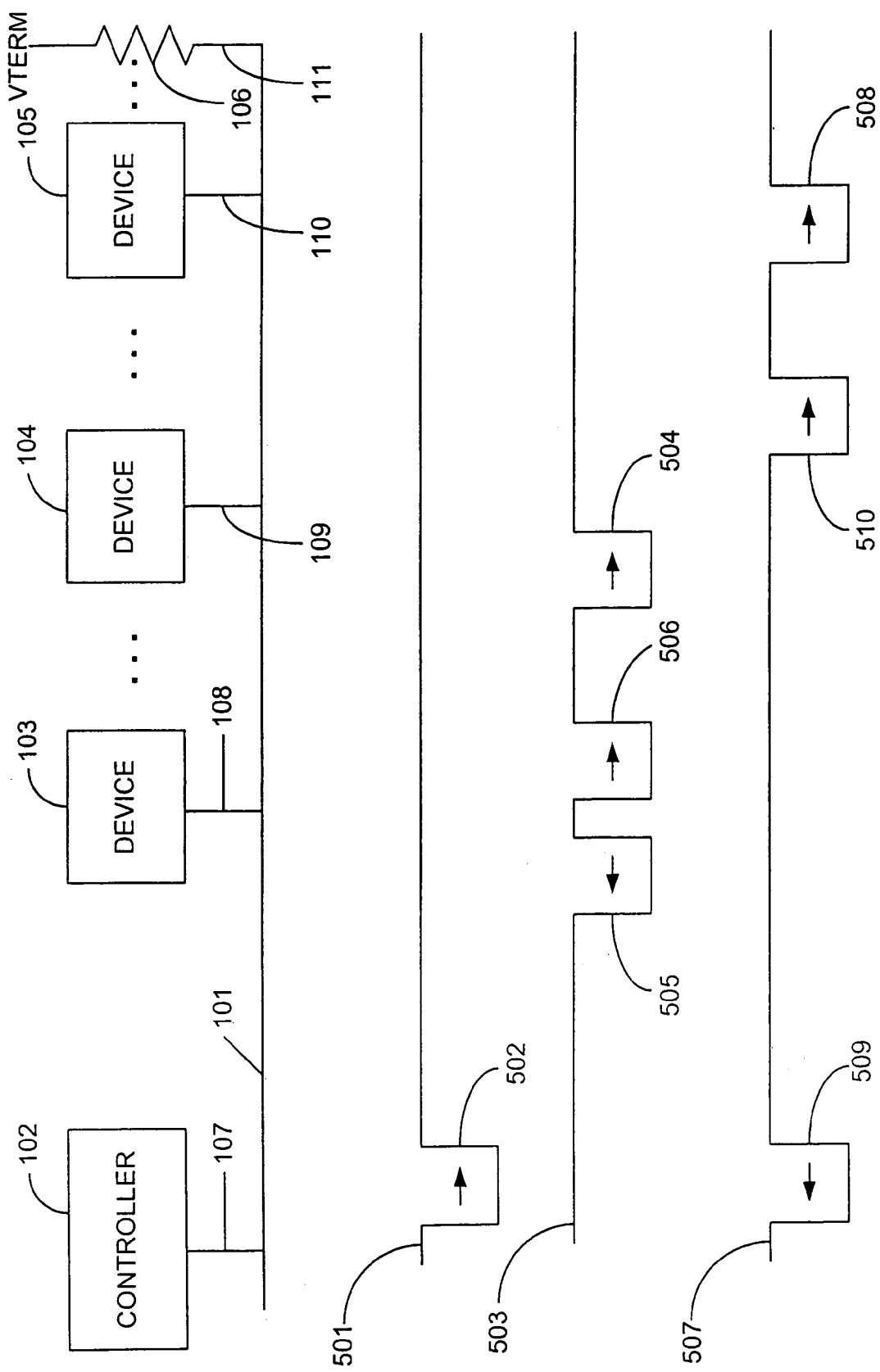
FIG. 5 is a timing diagram illustrating a technique for allowing a read operation to occur prior to the completion of a write operation when the read device in one domain has a shorter flight time than a write device in another domain in accordance with an embodiment of the present disclosure.

FIG. 5 is a timing diagram illustrating a technique for allowing a read operation to begin prior to the completion of a write operation when the read device in one domain has a shorter flight time than a write device in another domain in accordance with an embodiment of the present disclosure. In this instance, the flight time refers to a time required for a wave to propagate along bus 101 between controller 102 and a device on bus 101 with which controller 102 is communicating. The flight time is determined by physical constraints, for example the speed of light and the dielectric constant of the bus 101, in addition to the distance from controller 102 to a device on bus 101. If bus 101 provides a linear path between controller 102 and termination 106, with devices 103 through 105 coupled to bus 101 at specific locations along bus 101, devices located closer to controller 102 will have shorter flight times, while devices located farther from controller 102 will have longer flight times. While the present disclosure may be practiced with a linear bus topology, other topologies may also be used.

Bus 101, controller 102, devices 103 through 105, termination 106, and couplings 107 through 111 are illustrated to provide a reference for the location of waves in waveforms 501, 503, and 507. Waveform 501 illustrates incident write wave 502 being applied to bus 101 by controller 102. Waveform 503 illustrates continued propagation of incident write wave 502, which appears as incident write wave 504. In waveform 503, incident read wave 505 and incident terminating wave 506 are applied to bus 101 by device 103, which, in this case, is the read device. Incident read way 505 and incident terminating wave 506 are applied to bus 101 after incident write wave 504 passes the read device on bus 101. Waveform 507 illustrates continued propagation of incident read wave 505, incident terminating wave 506, and incident write wave 504. Incident write wave 504 appears as incident write wave 508. Note that devices 104 or 105 can receive the incident write wave 504 or 508, respectively, without interference from a subsequent read operation. Incident read wave 505 appears as incident read wave 509, which arrives at controller 102. Incident terminating wave 506 is illustrated as incident terminating wave 510. Both incident write wave 508 and incident terminating wave 510 are destined for termination 106. When they reach termination 106, they will disappear from bus 101. As can be seen, by performing a read operation at a read device after write data has passed the location of the read device, interference between the read operation and the write operation is avoided.

Figure 6:
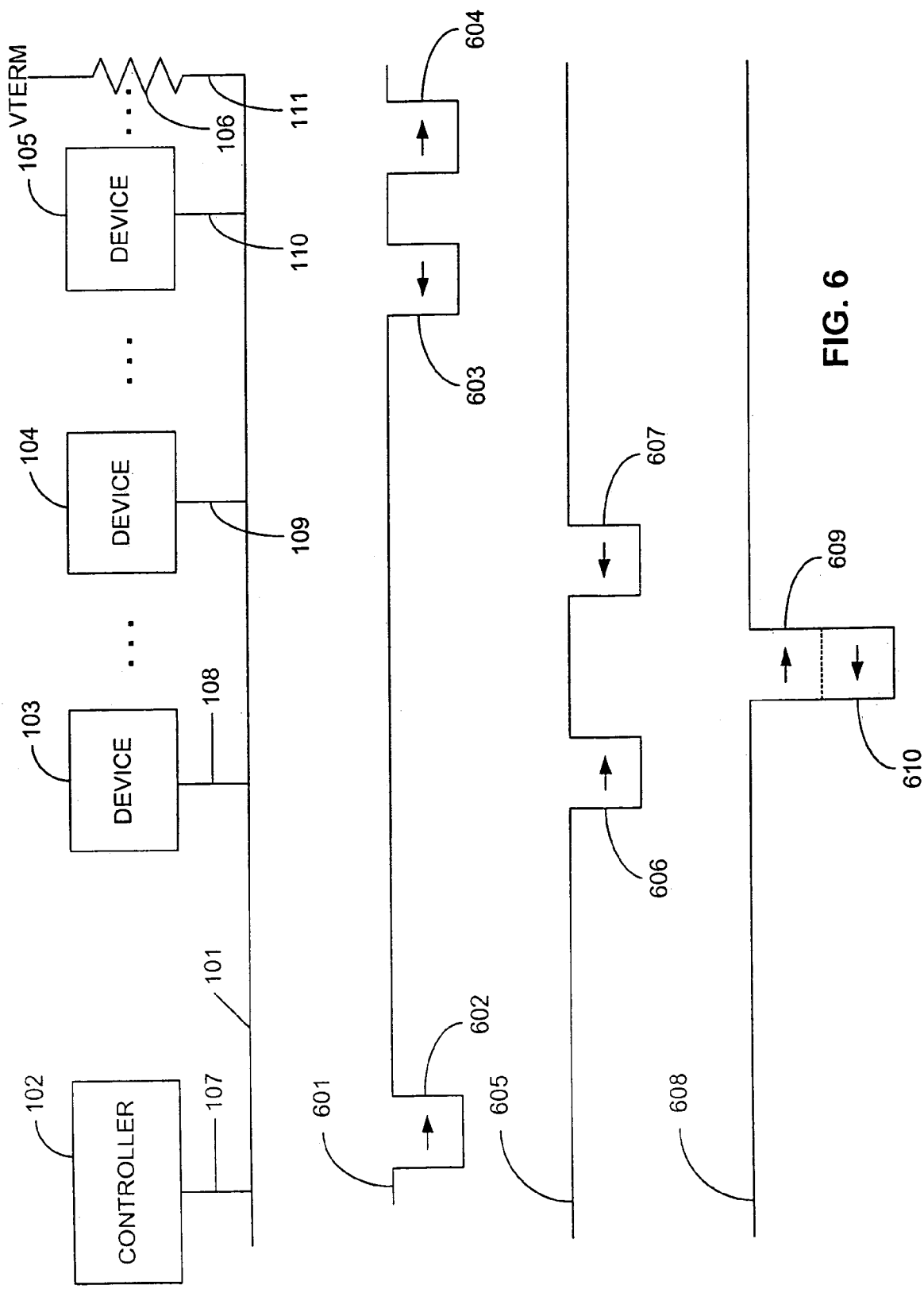
FIG. 6 is timing diagram illustrating a technique for scheduling a read operation after a write operation when the read device in one domain has a longer flight time than a write device in another domain in accordance with an embodiment of the present disclosure.

FIG. 6 is timing diagram illustrating a technique for scheduling a read operation after a write operation when the read device in one domain has a longer flight time than a write device in another domain in accordance with an embodiment of the present disclosure. Bus 101, controller 102, devices 103 through 105, termination 106, and couplings 107 through 111 are illustrated to provide a reference for the position of waves in waveforms 601, 605, and 608. In waveform 601, controller 102 applies incident write wave 602 to bus 101. Device 105 applies read data to bus 100, resulting in incident read wave 603 and incident terminating wave 604. Incident write wave 602 and incident terminating wave 604 propagate towards termination 106. Incident read wave 603 propagates toward controller 102. Waveform 605 illustrates the continued propagation of incident write wave 602 and incident read wave 603. By the time of waveform 605, incident terminating wave 604 has reached termination 106 and has disappeared from bus 101. Incident write wave 606 arrives at device 103, which is the write device. Incident write wave 606 represents the continued propagation of incident write wave 602. The write device receives the data associated with incident write wave 606. Incident write wave 606 continues to propagate along bus 101 toward termination 106. Incident read wave 607 represents the continued propagation of incident read wave 603. Incident read wave 607 approaches incident write wave 606.

Waveform 608 includes incident write wave 609 and incident read wave 610. Incident write wave 609 represents the continued propagation of incident write wave 606 of waveform 605. Incident read wave 610 represents the continued propagation of incident read wave 607 of waveform 605. Since incident write wave 609 and incident read wave 610 are passing each other on bus 101 in waveform 608, superposition occurs between incident write wave 609 and incident read wave 610. Write operations and read operations are scheduled such that the superposition of incident write wave 609 and incident read wave 610 does not occur at a critical location along bus 101, for example at controller 102 or at a device to which data is being written or from which data is being read. Such scheduling allows the superposition to occur without interference to the write operations or read operations, thus increasing the utilization of the bus.

It should be understood that the technique described above in reference to FIG. 6 applies not only to a single-end-terminated system (e.g., a system having termination 106, but not optional termination 115), but also to a double-end-terminated system (e.g., a system having both termination 106 and optional termination 115).

Figure 7:
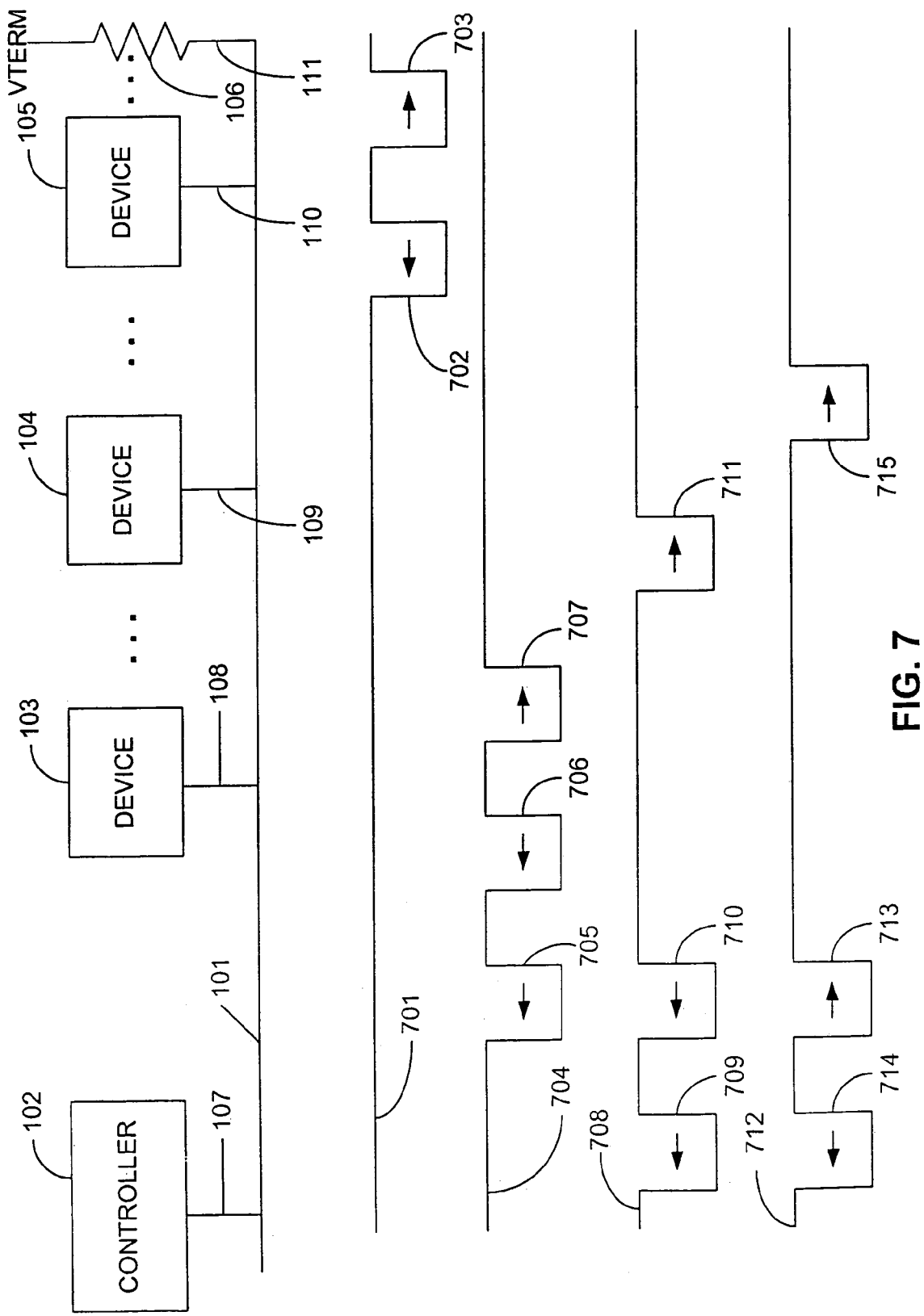
FIG. 7 is timing diagram illustrating a technique for performing a second read operation following a first read operation where the first read device in a first domain has a longer flight time than the second read device in a second domain in accordance with an embodiment of the present disclosure.

FIG. 7 is timing diagram illustrating a technique for performing a second read operation following a first read operation where the first read device in a first domain has a longer flight time than the second read device in a second domain in accordance with an embodiment of the present disclosure. Bus 101, controller 102, devices 103 through 105, termination 106, and couplings 107–111 are illustrated to provide a reference for the location of waves in waveforms 701, 704, 708, and 712.

Waveform 701 illustrates incident read wave 702 and incident terminating wave 703 resulting from data applied to bus 101 by device 105, which, in this case, is the first read device. Incident read wave 702 propagates toward controller 102, while incident terminating wave 703 propagates toward termination 106. Waveform 704 illustrates the continued propagation of incident read wave 702 toward controller 102, which appears as incident read wave 705. Waveform 704 also includes incident read wave 706 and incident terminating wave 707 applied to bus 101 by device 103, which, in this case, is the second read device. The second read device applies incident read wave 706 and incident terminating wave 707 to bus 101 after incident read wave 705 has passed the location of the second read device on bus 101.

Waveform 708 illustrates the continued propagation of incident read wave 705, incident read wave 706, and incident terminating wave 707 along bus 101. Incident read wave 705 appears as incident read wave 709. Incident read wave 706 appears as incident read wave 710. Incident terminating wave 707 appears as incident terminating wave 711. As illustrated in waveform 708, incident read wave 709 arrives at controller 102, which receives the data associated with incident read wave 709. Waveform 712 illustrates the continued propagation of incident read wave 709, incident read wave 710, and incident terminating wave 711. If no termination is provided on bus 101 at controller 102, incident read wave 709 is reflected and becomes reflected wave 713. Incident read wave 710 continues to propagate and appears as incident read wave 714, which is received at controller 102. Incident terminating wave 711 continues to propagate and appears as incident terminating wave 715. As can be seen, by scheduling the second read operation to occur after the incident read wave associated with the first read operation has passed the location associated with the second read device, data associated with both the first read operation and the second read operation can exist simultaneously on bus 101 without interference to each other.

Figure 8:
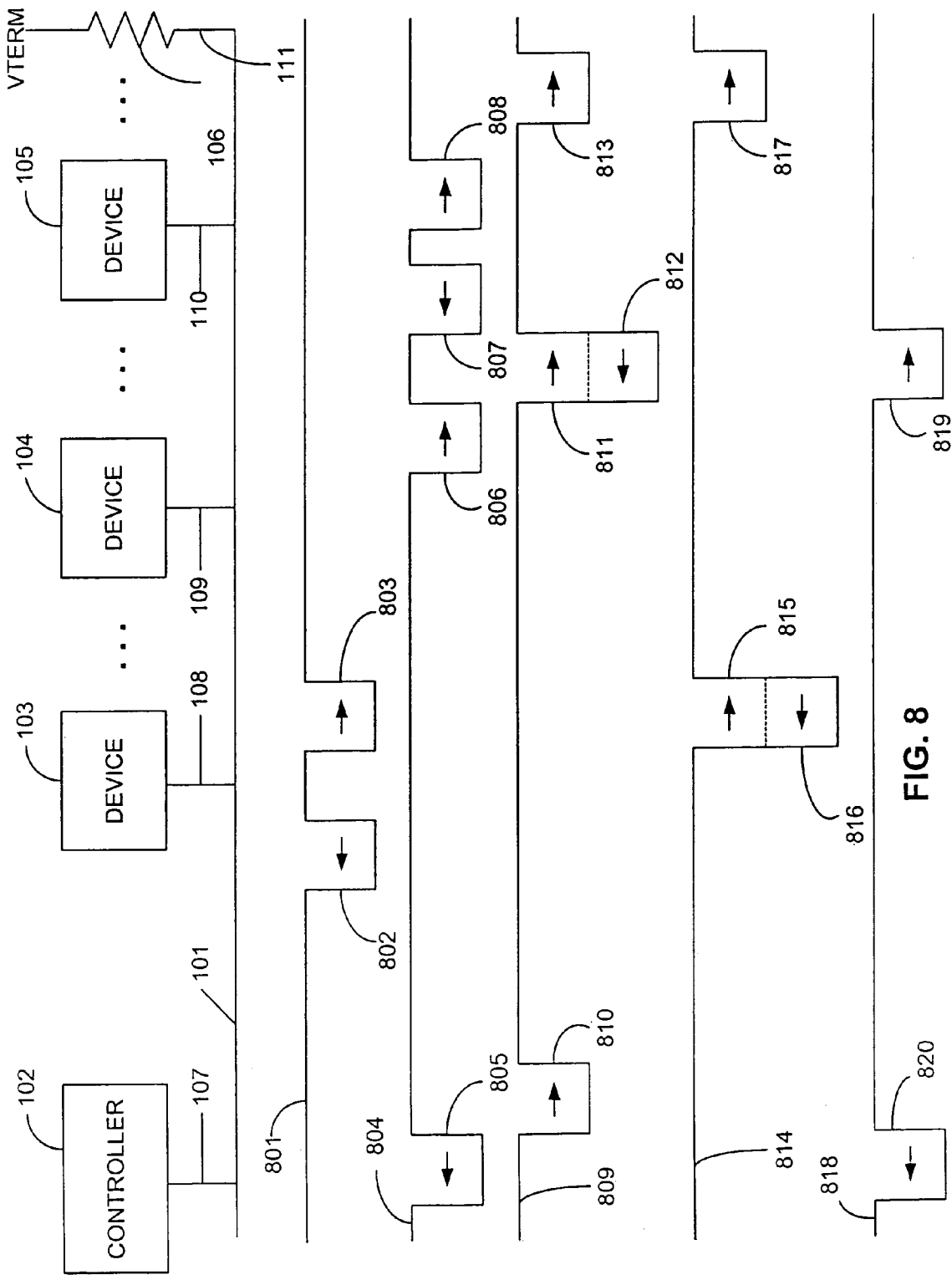
FIG. 8 is a timing diagram illustrating a technique for performing a second read operation following a first read operation when the first read device in a first domain has a shorter flight time than the second read device in a second domain in accordance with an embodiment of the present disclosure.

FIG. 8 is a timing diagram illustrating a technique for performing a second read operation following a first read operation when the first read device in a first domain has a shorter flight time than the second read device in a second domain in accordance with an embodiment of the present disclosure. Bus 101, controller 102, devices 103 through 105, termination 1067, and couplings 107 through 111 are illustrated to provide reference for the locations of waves in waveforms 801, 804, 809, 814, and 818.

Waveform 801 illustrates incident read wave 802 and incident terminating wave 803 resulting from data being applied to bus 101 by device 103, which, in this case, is the first read device. Incident read wave 802 propagates toward controller 102, while incident terminating wave 803 propagates toward termination 106. Waveform 804 illustrates the continued propagation of incident read wave 802, which appears as incident read wave 805, and incident terminating wave 803, which appears a incident terminating wave 806. Incident read wave 805 arrives at controller 102, which receives the data associated with incident read wave 805. Waveform 804 also illustrates incident read wave 807 and incident terminating wave 808 resulting from data applied to bus 101 by device 105, which, in this case, is the second read device. Incident read wave 807 propagates toward controller 102, while incident terminating wave 808 propagates towards termination 106.

Waveform 809 illustrates the continued propagation of incident read wave 805, incident terminating wave 806, incident read wave 807, and incident terminating wave 808. If no termination is provided at the end of bus 101 near controller 102, incident read wave 805 is reflected and appears as reflected wave 810, which propagates towards termination 106. Incident terminating wave 806 continues to propagate and appears as incident terminating wave 811. Likewise, incident read wave 807 continues to propagate and appears as incident read wave 812. As can be seen, incident terminating wave 811 and incident read wave 812 pass each other, and superposition occurs. The first read operation and the second read operation are scheduled such that the superposition does not occur at a critical location, for example at controller 102 or at a device from which data is being read in either the first read operation or the second read operation. As long as the scheduling is performed so as to prevent superposition at a critical location, the superposition can occur without adversely affecting the read operations. Incident terminating wave 808 of waveform 804 continues to propagate and appears and incident terminating wave 813 in waveform 809.

Waveform 814 illustrates the continued propagation of reflected wave 810, incident terminating wave 811, incident read wave 812, and incident terminating wave 813. Reflected wave 810 appears as reflected wave 815. Incident read wave 812 appears as incident read wave 816. Incident terminating wave 811 appears as incident terminating wave 817. Incident terminating wave 813 has reached termination 106 and is no longer present on bus 101. As can be seen, reflected wave 815 passes incident read wave 816, resulting in superposition. The first read operation and the second read operation are scheduled so as to prevent the superposition from occurring in a critical location at a critical time, for example, at a device from which data is being read in either the first read operation or the second read operation while such data is being put on bus 101 by the first or second read devices. Such scheduling prevents such adverse affects from interfering with the first read operation or the second read operation. It should be noted that an incident wave and its corresponding reflected wave may superimpose at an unterminated controller without adversely affecting operation.

Waveform 818 illustrates the continued propagation of reflected wave 815, incident read wave 816, and incident terminating wave 817. Reflected wave 815 continues to propagate and appears as reflected wave 819. Incident read wave 816 continues to propagate and arrives at controller 102 as incident read wave 820. Controller 102 receives the data associated with incident read wave 820. Incident terminating wave 817 has reached termination 106 and is no longer present on bus 101.

It should be noted that, while the waves illustrated in FIGS. 2 through 8 are shown as having identical amplitude, the waves need not be of identical amplitude. Rather, various combinations of various waves of various amplitude are possible, provided the waves have amplitudes that are discernable by their intended recipients to represent their intended logic levels.

Figure 9:
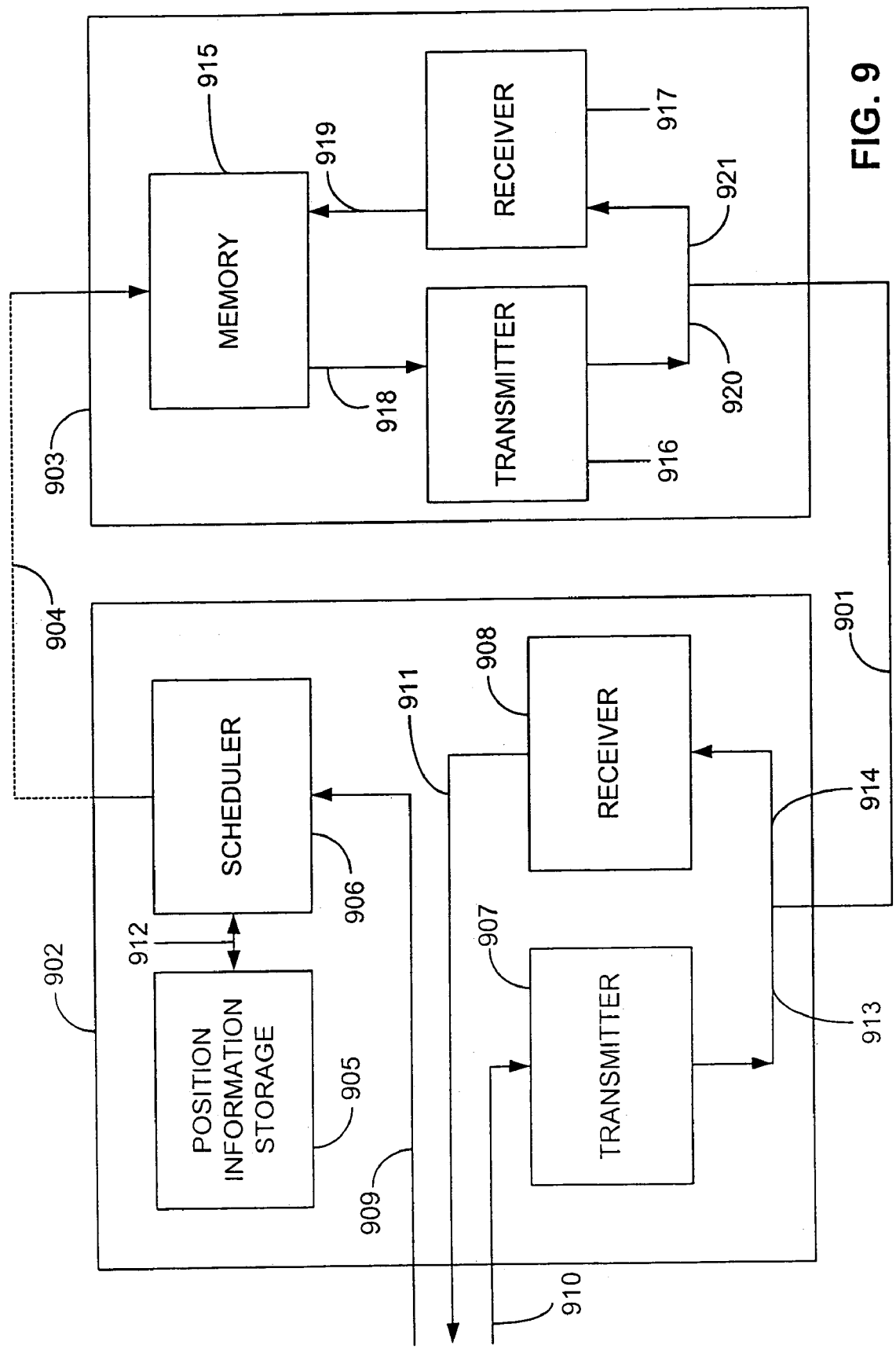
FIG. 9 is a block diagram illustrating a controller and a device in accordance with an embodiment of the present disclosure.

FIG. 9 is a block diagram illustrating a controller and a device in accordance with an embodiment of the present disclosure. Controller 902 includes transmitter 907, receiver 908, position information storage 905 and scheduler 906. Transmitter 907 receives data via input 910 and transmits data to bus 901 via coupling 913. Receiver 908 receives data from bus 901 via coupling 914 and provides the data to output 911. Scheduler 906 receives input 909. Scheduler 906 is coupled to position information storage 905 via coupling 912, which allows it to exchange position information with position information storage 905. Scheduler 906 is optionally coupled to bus 901, either directly or through intervening circuitry, for example, through transmitter 907 and/or receiver 908. Scheduler 906 is optionally coupled to control bus 904. In the event that control bus 904 is provided, control signals may be communicated to a device, such as device 903, via control bus 904, while data may be communicated via bus 901, which may be referred to as a data bus. Control bus flight times may be determined from control bus 904, while data bus flight times may be determined from data bus 901. The control bus flight time is the time that control signals take to pass from controller 902 to device 903 via control bus 904, while the data bus flight time is the time that data signals take to pass between controller 902 and device 903 via bus 901. Position information stored in position information storage 905 may be obtained using techniques discussed below in reference to FIG. 10.

Device 903 includes memory 915, transmitter 916, and receiver 917. Memory 915 receives control information from scheduler 916 via optional control bus 904. Memory 915 provides data to transmitter 916 via coupling 918. Transmitter 916 transmits data to bus 901 via coupling 920. Receiver 917 receives data from bus 901 via coupling 921. Receiver 917 passes the data to memory 915 via coupling 919.

Scheduler 906 can generate a request to be communicated to device 903. The request can indicate a task to be completed by the device 903 and a time to initiate the task. In one example, a request indicates that device 903 is to receive data during a write operation and indicates the time for that task to occur. In another example, a request indicates that device 903 is to transmit data during a read operation and indicates the time for that task to occur.

Figure 10:
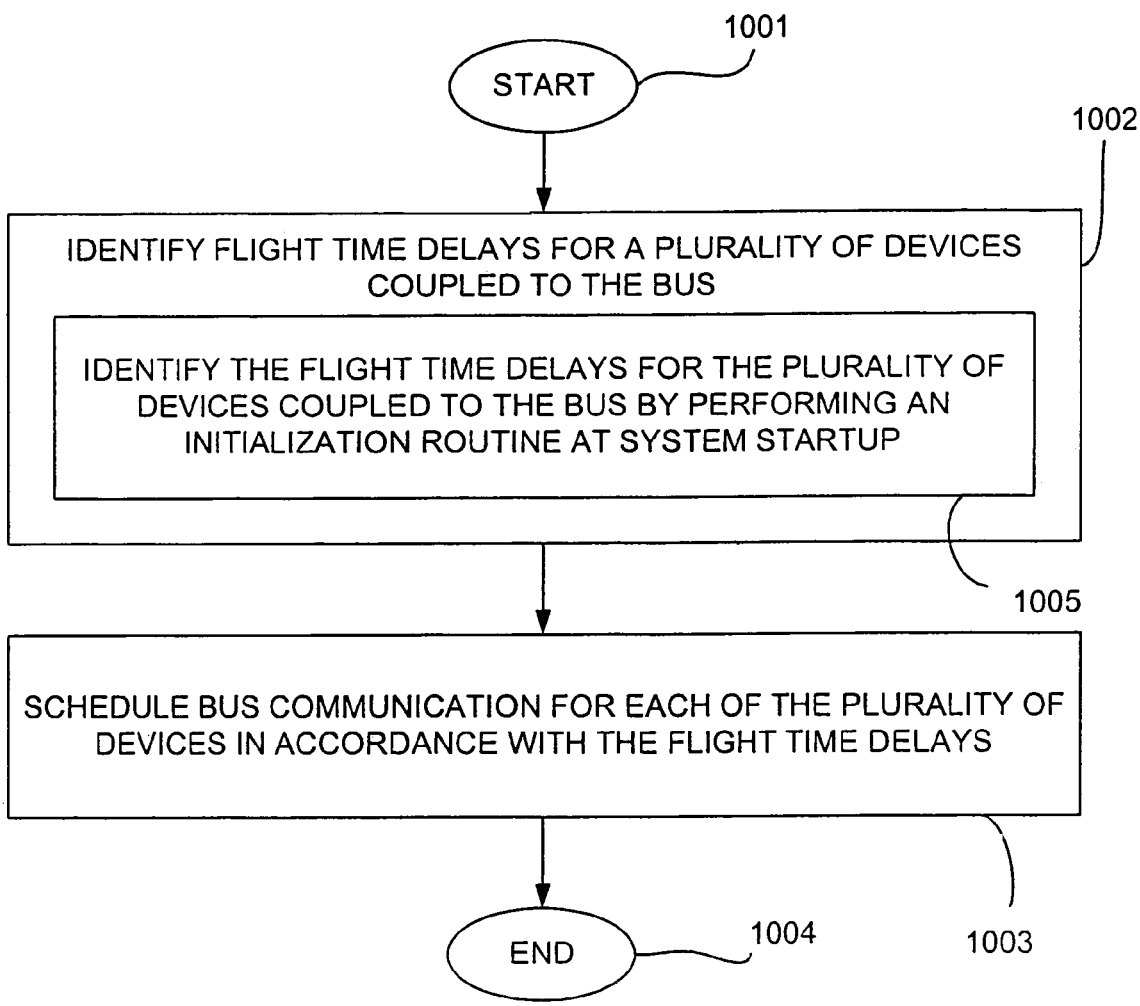
FIG. 10 is a flow diagram illustrating a method in accordance with an embodiment of the present disclosure.

FIG. 10 is a flow diagram illustrating a method in accordance with an embodiment of the present disclosure. In step 1002, flight times for a plurality of devices coupled to a bus are identified. Step 1002 may include step 1005. In step 1005, the flight times for the plurality of devices coupled to the bus are identified by performing an initialization routine at system startup. If the bit time is short relative to the propagation time along the bus, the propagation time to each of the devices along the bus can be measured empirically. The controller can attempt to communicate with each device while varying the number of clock cycles allowed for the communication. Based on numbers of clock cycles that yield successful communication, the flight time for a particular device along the bus can be determined.

An effective response time for devices coupled to a bus may be determined. For example, in a memory system comprising a memory controller and memory devices coupled to a common bus, the response time may be determined by writing logical ones to a memory location of a memory device. Subsequently, a read command is issued over the bus, wherein the read command is addressed to the newly-written memory location of the memory device. The memory controller then measures the elapsed time between the issuance of the read command and the receipt of the logical "ones" from the memory device, and this elapsed time is the response time of the memory device. Following determination of a response time for each memory device, delays intrinsic in the memory device, for example, CAS delays, can be subtracted to determine delays intrinsic in the bus, for example, the round trip flight time and the one-way flight time.

Alternatively, if other delays, for example, the CAS delay, for a device are known or programmed to a known value, the controller can determine the flight time by measuring the time that elapses between the issuance of a control signal and the receipt of a response. If the flight time of the control bus and the data bus are substantially the same, if the flight time of the control bus is known, and/or if the flight time of the data bus can be measured empirically and then programmed based on those measurements, then the flight time of the data bus can be determined. The effective response time can be calculated as the sum of the flight time of the control bus, the device latency, and the flight time of the data bus.

If the flight time of the control bus and the data bus are substantially the same, the flight time of the data bus can be determined by subtracting the device latency from the effective response time and dividing the result by two. If the flight time of the control bus is known, the flight time of the data bus can be determined by subtracting the flight time of the control bus and the device latency from the effective response time. If the flight time of the data bus has been measured and programmed, the flight time of the data bus is equal to the programmed flight time. As an example, the flight time of the data bus can be measured, such as during an initialization routine when power is first applied to the system, and the result of the measurement can be used to provide a flight time value that can be stored for later use in scheduling bus operations. This flight time value, which may be referred to as a programmed flight time, can be used, for example, by a memory controller as a memory device's flight time for scheduling memory bus operations involving that memory device. Alternatively, other techniques may be used to determine the flight times for the devices. As an example, known flight times can be stored for use in scheduling.

From step 1002, the method continues to step 1003. In step 1003, bus communication is scheduled for each of the plurality of devices in accordance with the flight times measured in identified in step 1002. Such bus communication includes bus communication operations, for example, read operations, write operations, and other operations where data are communicated over a bus. Such bus communication operations are used to perform corresponding tasks, e.g., a memory read task, a memory write task, etc. Since flight times denominated in clock cycles have been determined in step 1002, such flight times can be used to schedule the bus communication. For example, if first data read from a first domain will take ten clock cycles to reach the destination and second data read from a second domain will take eight clock cycles to reach the destination, the first domain and the second domain appear to be separated by a section of the bus that signals traverse in two clock cycles. Thus, one constraint to be applied by the scheduler is to avoid scheduling the second read operation for the second data at the second domain to occur two cycles after the first read operation for the first data at the first domain. If this constraint were not accommodated by the scheduler, the first data would be passing the second domain while the second domain would be attempting to drive the bus with the second data, and interference could result between the first data and the second data.

As an example of how the scheduler could accommodate the constraint, the scheduler could schedule the second read operation to occur at the second domain three clock cycles after the first read operation occurs at the first domain. By determining all such constraints and scheduling bus communication to accommodate all such constraints, the scheduler can avoid pattern interference between data under a wide variety of circumstances, including, but not limited to read operations after write operations and back-to-back multiple read operations. Consequently, this method provides a technique capable of preventing 3/2 wave conditions and 2/2 wave conditions from occurring.

Figure 11:
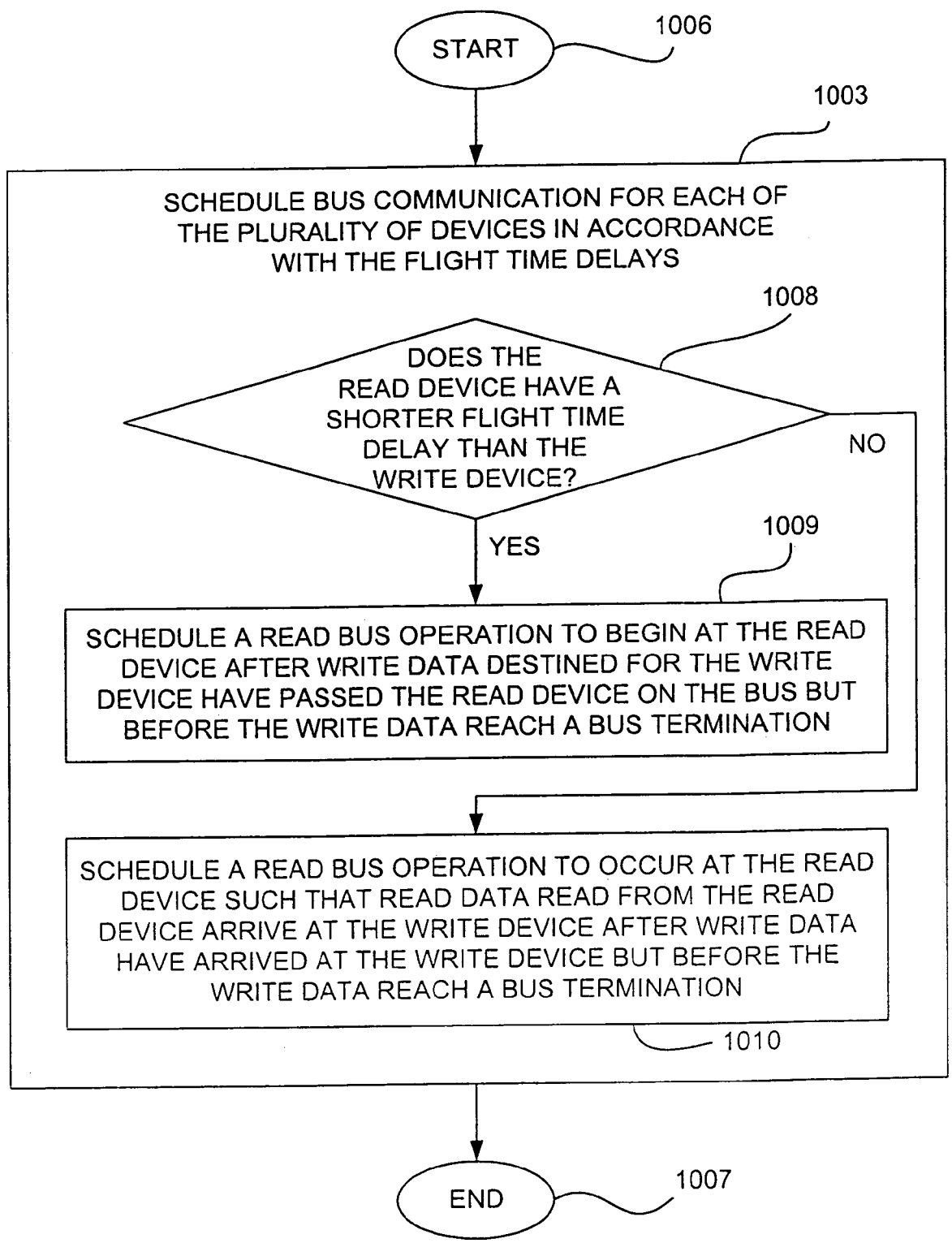
FIG. 11 is a flow diagram illustrating a method for practicing step 1003 of FIG. 10 when a read operation follows a write operation in accordance with an embodiment of the present disclosure.

FIG. 11 is a flow diagram illustrating a method for practicing step 1003 of FIG. 10 when a read operation follows a write operation in accordance with an embodiment of the present disclosure. The method begins in step 1006. In step 1003, bus communication is scheduled for each of the plurality of devices in accordance with the flight times of the devices. Step 1003 may include steps 1008, 1009, and/or 1010. In step 1008, a decision is made as to whether or not the read device has a shorter flight time than the write device. If so, the method continues to step 1008. In step 1008, a read operation is scheduled to begin at the read device after write data destined for the write device have passed the read device on the bus, but before the write data reach a bus termination. The read operation can follow the beginning of the write operation by a delay of greater than or equal to the flight time of the device been read.

If in step 1008, the read device does not have a shorter flight time than the write device, the method continues to step 1010. In step 1010, a read operation is scheduled to occur at the read device such that read data from the read device arrive at the write device after write data have arrived at the write device, but before the write data reach a bus termination. The read operation can begin up to a time before the write data have arrived at the device being written equal to the difference in flight time between the device being read and the device being written. This difference in flight times may be greater than, less than, or substantially equal to (e.g., within one clock cycle) the flight time of the device being written.

If the flight time of the device being written is less than the difference in flight times, the read operation may begin up to a time equal to the read device flight time minus twice the write device flight time before the write operation begins or at a time after the write operation begins. If the flight time of the device being written is greater than the difference in flight times, the read operation may begin after a time equal to the write device flight time minus the read device flight time after the write operation has begun. If the flight time of the device being written is substantially equal to the difference in flight times, the read operation may begin at any time after the write operation begins. If there is some inequality between the flight time of the device being written and the difference in flight times, the read operation can be delayed an additional amount of time equal to or greater than that inequality.

Reference to the beginning of the read operation or the beginning of the write operation refers to the time at which data for such operation is placed on the bus. It is understood that, given the control bus flight time and the device latency, a control signal to begin a read operation may be applied to the control bus up to the sum of the control bus flight time and the device latency before the read data may be applied to the data bus. From step 1003, the method continues to step 1007, where it ends.

Figure 12:
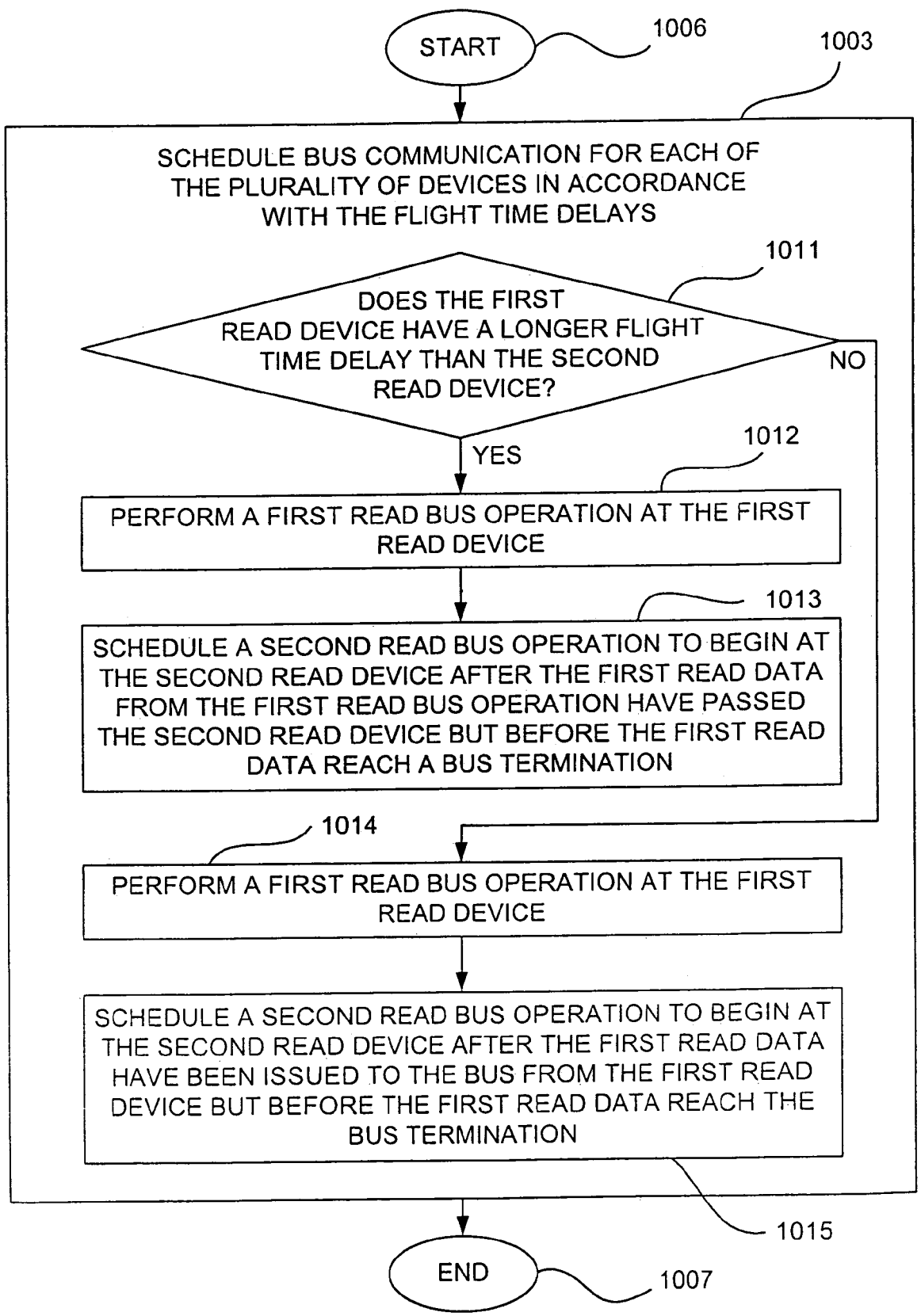
FIG. 12 is a flow diagram illustrating a method for practicing step 1003 of FIG. 10 when a second read operation follows a first read operation in accordance with an embodiment of the present disclosure.

FIG. 12 is a flow diagram illustrating a method for practicing step 1003 of FIG. 10 when a second read operation follows a first read operation in accordance with an embodiment of the present disclosure. The method begins in step 1006 and continues to step 1003. In step 1003, bus communication is scheduled for each of the plurality of devices in accordance with the flight times. Step 1003 may include steps 1011, 1012, 1013, 1014, and/or 1015.

In step 1011, a decision is made as to whether or not the first read device has a longer flight time than the second read device. If so, the method continues in step 1012. In step 1012, a first read operation is performed at the first read device. From step 1012, the method continues to step 1013. In step 1013, a second read operation is scheduled to begin at the second read device after the first read data from the first read operation have passed the second read device, but before the first read data reach a bus termination.

If, in step 1011, the decision is made that the first read device does not have a longer flight time than the second read device, the method continues to step 1014. In step 1014, a first read operation is performed at the first read device. From step 1014, the method continues to step 1015. In step 1015, a second read operation is scheduled to begin at the second read device after the first read data have been issued to the bus from the first read device, but before the first read data reach the bus termination. From step 1003, the method continues to step 1007, where it ends.

It should be understood that terms described using ordinal adjectives, such as first request, second request, first device, second device, first time, second time, first task, second task, first flight time, and second flight time are used for identification to distinguish between claimed features and need not imply a particular order or relationship between the features. Nevertheless, in a preferred embodiment of the present disclosure, the first request precedes the second request.

Accordingly, a method and apparatus for position dependent data scheduling has been described. It should be understood that the implementation of other variations and modifications of the present disclosure in its various aspects will be apparent to those of ordinary skill in the art, and that the present disclosure is not limited by the specific embodiments described. It is therefore contemplated to cover by the present disclosure, any and all modifications, variations, or equivalents that fall within the spirit and scope of the basic underlying principles disclosed and claimed herein.

The invention claimed is:

1. A method for communicating signals along a bus, the method comprising:
   identifying signal propagation times associated with signals propagating along the bus from a plurality of devices coupled to the bus; and
   scheduling bus communications for the plurality of devices in accordance with the signal propagation times, such that signals that are simultaneously present on the bus do not interfere with each other at operation locations associated with the plurality of devices along the bus when the plurality of devices perform operations at such operation locations.

2. The method of claim 1, further comprising:
   transmitting signals from at least some of the plurality of devices on the bus such that the signals are simultaneously present on the bus.

3. The method of claim 1, wherein each signal propagation time represents a time for a signal to propagate from one of the plurality of devices to another of the plurality of devices along the bus.

4. The method of claim 3, wherein each signal propagation time is identified in units of clock cycles, and wherein bus communications are scheduled for specific clock cycles.

5. The method of claim 1, wherein at least some of the plurality of devices are memory devices.

6. The method of claim 5, wherein at least some of the memory devices are dynamic random access memory (DRAM) devices.

7. The method of claim 1, wherein at least one of the plurality of devices is a memory controller.

8. The method of claim 1, wherein the operation locations associated with the plurality of devices along the bus are locations where the plurality of devices read signals from the bus.

9. The method of claim 8, wherein the plurality of devices perform operations at operation locations along the bus by reading signals from the bus at such operation locations.

10. The method of claim 1, wherein the operation locations associated with the plurality of devices along the bus are locations where the plurality of devices write signals onto the bus.

11. The method of claim 10, wherein the plurality of devices perform operations at operation locations along the bus by writing signals onto the bus at such operation locations.

12. The method of claim 1, wherein the bus is a bidirectional digital data bus.

13. At least one processor readable carrier for storing a computer program of instructions configured to be readable by at least one processor for instructing the at least one processor to execute a computer process for performing the method as recited in claim 1.

14. A system for communicating signals along a bus, the system comprising:
   means for identifying signal propagation times associated with signals propagating along the bus from a plurality of devices coupled to the bus; and
   means for scheduling bus communications for the plurality of devices in accordance with the signal propagation times, such that signals that are simultaneously present on the bus do not interfere with each other at operation locations associated with the plurality of devices along the bus when the plurality of devices perform operations at such operation locations.

15. A system for communicating signals along a bus, the system comprising:
   a bus;
   a first device coupled to the bus configured to transmit signals on the bus, at least one signal transmitted on the bus from the first device having an associated first signal propagation time;
   a second device coupled to the bus configured to transmit signals on the bus, at least one signal transmitted on the bus from the second device having an associated second signal propagation time;

a third device coupled to the bus; and a scheduler device coupled to the first device and the second device, the scheduler device scheduling bus communications for the first device and the second device in accordance with the first signal propagation time and the second signal propagation time, such that signals transmitted from the first device and the second device that are simultaneously present on the bus do not interfere with each other at an operation location associated with the third device along the bus when the third device performs an operation at such operation location.

16. The system of claim 15, wherein the scheduler device is a memory controller.

17. The system of claim 15, wherein at least one of the first, second, and third devices is a memory device.

18. The system of claim 17, wherein at least one of the first, second, and third devices is a dynamic random access memory (DRAM) device.

19. The system of claim 15, wherein the first signal propagation time and the second signal propagation time are measured in units of clock cycles, and wherein the bus communications are scheduled for specific clock cycles.

20. The system of claim 15, wherein the first signal propagation time represents a time for a signal to propagate from the first device to another device along the bus.

21. The system of claim 15, wherein the second signal propagation time represents a time for a signal to propagate from the second device to another device along the bus.

22. The system of claim 15, wherein the operation location associated with the third device along the bus is a location along the bus where the third device reads signals from the bus.

23. The method of claim 22, wherein the third device performs an operation at the operation location by reading signals from the bus at such operation location.

24. The system of claim 15, wherein the operation location associated with the third device along the bus is a location along the bus where the third device writes signals onto the bus.

25. The system of claim 24, wherein the third device performs an operation at the operation location by writing signals onto the bus at such operation location.

26. The system of claim 15, wherein the bus is a bidirectional digital data bus.

27. A system for communicating signals along a bus, the system comprising:

a bus;

a first device coupled to the bus configured to transmit signals on the bus, at least one signal transmitted on the bus from the first device having an associated first signal propagation time;

a second device coupled to the bus configured to transmit signals on the bus; and a scheduler device coupled to the first device and the second device, the scheduler device scheduling bus communications for the first device and the second device in accordance with the first signal propagation time, such that signals transmitted and present on the bus from the first device do not interfere with signals to be transmitted and simultaneously present on the bus from the second device at an operation location associated with the second device along the bus when the second device performs an operation at such operation location.

* * * * *